United States Patent
Wu et al.

(10) Patent No.: US 10,761,586 B2
(45) Date of Patent: Sep. 1, 2020

(54) COMPUTER PERFORMANCE AND POWER CONSUMPTION OPTIMIZATION

(71) Applicant: Intel Corporation, Santa Clara, CA (US)

(72) Inventors: Keqiang Wu, San Ramon, CA (US); Yong-fong Lee, San Jose, CA (US); Krishnaswamy Viswanathan, Portland, OR (US); Emad Guirguis, Dublin, CA (US)

(73) Assignee: Intel Corporation, Santa Clara, CA (US)

( * ) Notice: Subject to any disclaimer, the term of this patent is extended or adjusted under 35 U.S.C. 154(b) by 249 days.

(21) Appl. No.: 15/867,880

(22) Filed: Jan. 11, 2018

(65) Prior Publication Data

US 2019/0041943 A1 Feb. 7, 2019

(51) Int. Cl.
*G06F 1/32* (2019.01)
*G06F 1/324* (2019.01)
*G06F 1/28* (2006.01)
*G06F 1/3206* (2019.01)

(52) U.S. Cl.
CPC ............. *G06F 1/324* (2013.01); *G06F 1/28* (2013.01); *G06F 1/3206* (2013.01)

(58) Field of Classification Search
None
See application file for complete search history.

(56) References Cited

U.S. PATENT DOCUMENTS

| | | | |
|---|---|---|---|
| 2006/0253715 A1* | 11/2006 | Ghiasi | G06F 1/3203 713/300 |
| 2007/0004102 A1* | 1/2007 | Dairiki | H01L 27/1266 438/149 |
| 2010/0057404 A1* | 3/2010 | Dittmann | G06F 1/3203 702/186 |
| 2011/0022833 A1* | 1/2011 | Nussbaum | G06F 1/324 713/100 |
| 2011/0154348 A1* | 6/2011 | Elnozahy | G06F 1/324 718/104 |
| 2012/0324250 A1* | 12/2012 | Chakraborty | G06F 1/206 713/300 |
| 2014/0380076 A1* | 12/2014 | Weissmann | G06F 1/324 713/323 |
| 2016/0342191 A1* | 11/2016 | On | G06F 1/324 |
| 2017/0063652 A1 | 3/2017 | Wu et al. | |

(Continued)

OTHER PUBLICATIONS

AMD, "Cool 'n' Quiet Technology Installation Guide for AMD Athlon 64 Processor Based Systems", Jun. 2004, pp. 1-11.

(Continued)

*Primary Examiner* — Danny Chan
(74) *Attorney, Agent, or Firm* — Jordan IP Law, LLC

(57) ABSTRACT

Systems, apparatuses and methods may provide for technology that determines a first real-time correlation between a power consumption of a processor and an operating frequency of the processor, determines a second real-time correlation between a performance level of the processor and the operating frequency of the processor, and sets the operating frequency of the processor to a value based on the first and second real-time correlations. In one example, the performance level or performance per watt of the processor decreases at one or more operating frequencies greater than the value.

25 Claims, 6 Drawing Sheets

(56) References Cited

U.S. PATENT DOCUMENTS

2018/0129534 A1* 5/2018 Iyigun .................. G06F 1/08
2019/0086981 A1* 3/2019 Deng .................. G06F 1/324

OTHER PUBLICATIONS

Intel, "Enhanced Intel SpeedStep Technology for the Intel Pentium M Processor", White Paper, Mar. 2004, pp. 1-12.

E-Mon, "E-Mon Energy Software Server Version", Feb. 12, 2016, 1 page.

Dr. Shailesh Shivaji Deore, "Joulemeter: Power Measurement for Virtual Machine in Private Cloud Computing", International Advanced Research Journal in Science, Engineering and Technology, vol. 3, Issue 4, Apr. 2016, pp. 66-69.

Brodowski et al., "Linux CPUFreq CPUFreq Governors—information for users and developers", CPU Frequency and Voltage Scaling Code in Linux(TM) Kernel, kernal.org/doc/Documentation/cpo-freq/governor.txt, retrieved on Nov. 22, 2017, 5 pages.

"[Videocardz] Intel counters 16c/32t Threadripper with 18c/36t Core i9—p. 17", overclock.net/t/1631269/videocardz-intel-counters-16c-32t-threadripper-with-18c-36t-core-i9/160, retrieved on Nov. 23, 2017, 7 pages.

Arnaldo Carvalho De Melo, "The New Linux 'pelf' Tools", 11 pages.

Amd, "AMD PowerNow! Technology Dynamically Manages Power and Performance", Nov. 2000, 18 pages.

Accardi et a., "PowerTOP User's Guide", 2014, pp. 1-10.

Intel, "Intel Turbo Boost Max Technology (TMBT) 3.0 Release Notes", May 2016, pp. 1-9.

Microsoft, Productivity Tips for Visual Studio 2017, 2017, 2 pages.

Jack Donnell, "Java Performance Profiling using the VTune Performance Analyzer", White Paper, 2004, Intel, pp. 1-8.

\* cited by examiner

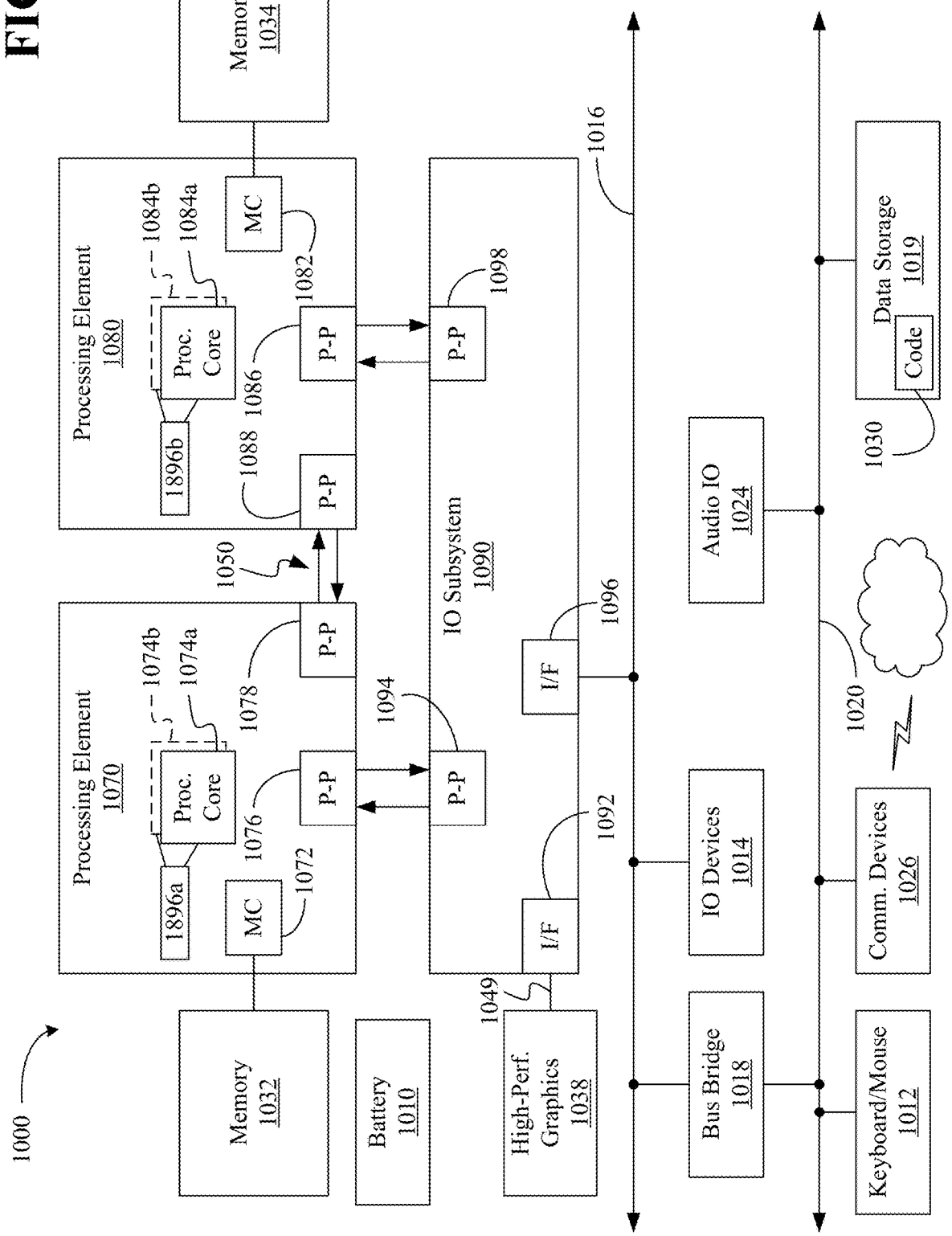

US 10,761,586 B2

COMPUTER PERFORMANCE AND POWER CONSUMPTION OPTIMIZATION

TECHNICAL FIELD

Embodiments generally relate to computer optimizations. More particularly, embodiments relate to computer performance and power consumption optimizations.

BACKGROUND

Conventional computing systems may be designed based on an assumption that increasing processor operating frequency necessarily achieves greater performance. Increasing operating frequency, however, may not always lead to greater performance. Because increasing operating frequency may increase power consumption, conventional solutions may exhibit suboptimal operating conditions.

BRIEF DESCRIPTION OF THE DRAWINGS

The various advantages of the embodiments will become apparent to one skilled in the art by reading the following specification and appended claims, and by referencing the following drawings, in which:

FIG. 8 is a block diagram of an example of a multi-processor based computing system according to an embodiment.

DESCRIPTION OF EMBODIMENTS

Figure 1:
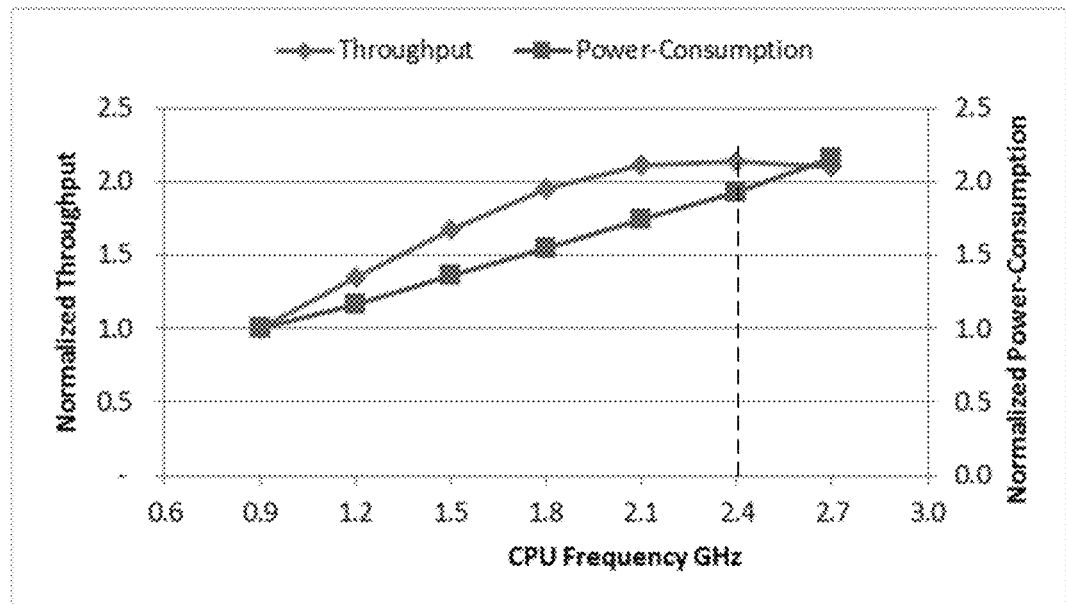
FIG. 1 is a chart of an example of a plot of correlations between power consumption, performance level and operating frequency according to an embodiment.

Turning now to FIG. 1, a plot 10 shows the relationship between the operating frequency of a processor (e.g., central processing unit/CPU), the normalized power consumption of the processor and the normalized throughput of the processor. The normalized throughput of the processor may generally be indicative of the performance level of the processor. In the illustrated example, both the performance and the power consumption of the processor increase until a certain operating frequency value (e.g., approximately 2.4 GHz in the example shown), after which the performance either levels off or begins to drop. Of particular note is that the power consumption may continue to increase beyond that value. As will be discussed in greater detail, determining the value at which the operating performance either levels off or drops in real-time (e.g., during execution of a specific application) may enable the operation of the processor to be optimized.

For example, setting the frequency to that value may prevent the processor from consuming unnecessary power while at the same time achieving maximum performance. Indeed, setting the frequency to the value may deliver the highest performance per watt. For the example, FIG. 1 demonstrates that as the CPU frequency changes from 2.1 GHz to 2.4 GHz, the illustrated throughput (e.g., performance) increases approximately 1%, but the illustrated power consumption increases 11%. Therefore, 2.1 GHz may be the optimal CPU frequency if the metric of performance per watt is adopted.

Figure 2:
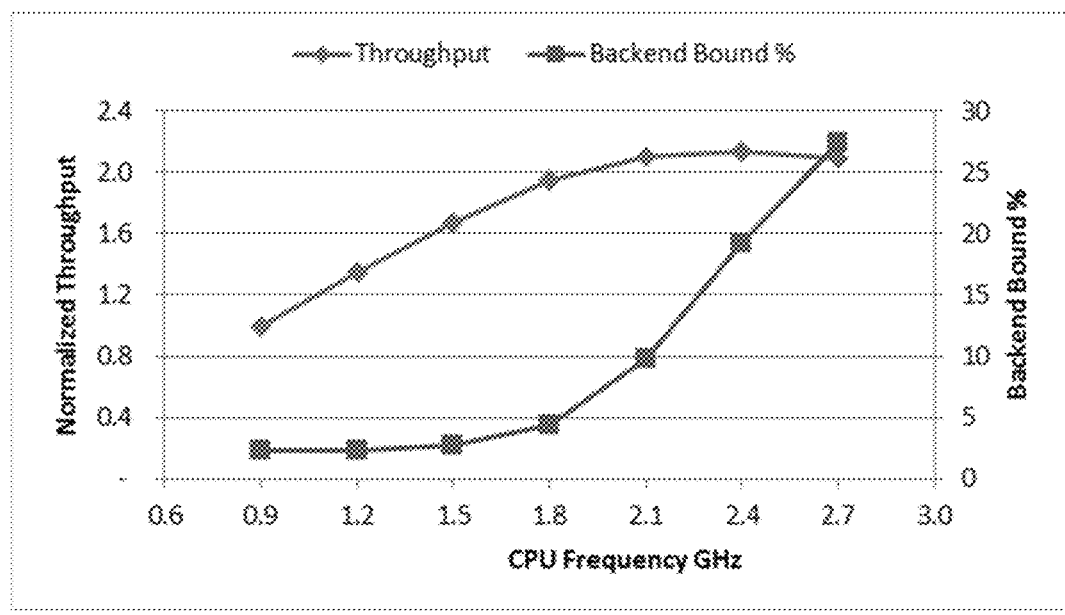
FIG. 2 is a chart of an example of a plot of backend bounded performance according to an embodiment.

FIG. 2 demonstrates that the performance may be primarily bounded by "backend" (e.g., cache and/or memory) performance.

Figure 3:
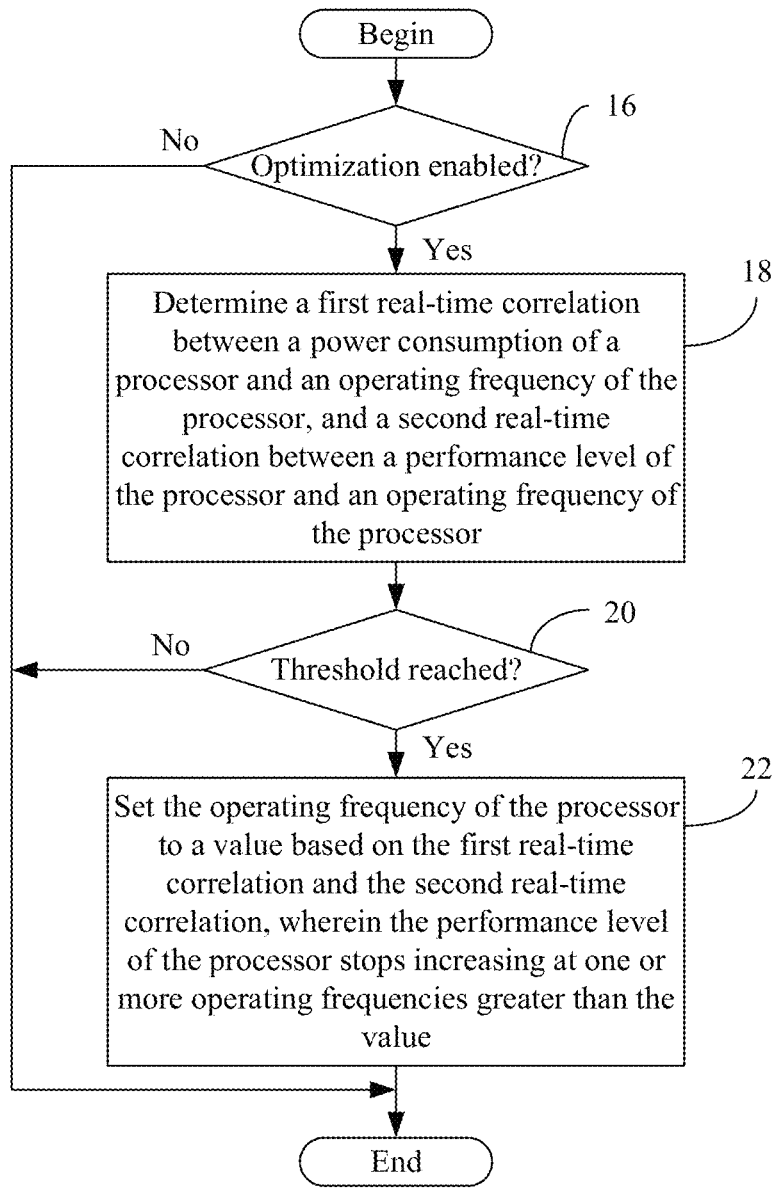
FIG. 3 is a flowchart of an example of a method of controlling a processor according to an embodiment.

FIG. 3 shows a method 14 of controlling a processor. The method 14 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 14 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 16 provides for determining whether real-time operating frequency optimizations are enabled for the processor. If the method 14 is implemented as an integrated feature of an application running on the processor, block 16 may include determining whether system level privileges (e.g., "ring-0" privileges) were granted to the application during installation. By contrast, if the method 14 is implemented in an operating system (OS) component such as, for example, a kernel driver or a frequency governor feature, block 16 might include determining whether the OS component has been activated.

If it is determined at block 16 that real-time operating frequency optimizations are enabled, illustrated block 18 determines a first real-time correlation between the power consumption and the operating frequency of the processor. For a specific processor model and SKU (stock keeping unit), the correlation of power consumption versus frequency may be available (e.g., from the corresponding processor vendor). In such a case, the first real-time correlation may be retrieved from a lookup table or other suitable data structure. Even if such information is not publicly available, the first real-time correlation may be established by collecting the power consumption data while dynamically varying the operating frequency (e.g., OS frequency governor).

Use the example of the plot 10 (FIG. 1), power consumption ("PC") versus frequency (f) may be modeled approximately as, $$PC(f) = a_3 \times f^3 + a_2 \times f^2 + a_1 \times f + a_0, \text{ where } a_3 \geq 0 \qquad (1)$$

Thus, the collection of power consumption data may enable the coefficients $a_0$-$a_3$ to be determined while the application in question is executing (e.g., in real-time).

Illustrated block 18 also determines a second real-time correlation between a performance level of the processor and the operating frequency of the processor. If the optimization component is integrated within the application being executed, then the performance level may be determined by tracking, for example, a committed transaction count associated with operation of the application on the processor. Other metrics such as, for example, transactions per second, jobs per second, page downloads per second, etc., may also be used.

If, however, the optimization component is not integrated within the application being executed, the optimization component (e.g., OS kernel driver and/or frequency governor of a server system) may have no prior knowledge of what software application will be executed or the software application behavior. In such a case, the processor performance may be estimated. For example, enterprise/cloud applications, such as Customer Relationship Management (CRM), Enterprise Resource Planning (ERP), Human Capital Management (HCM), Business Intelligence (BI), etc., may be deployed in a multi-tier environment. Thus, a user might submit a request from a local client machine to a remote server where an enterprise application is deployed. The enterprise application may execute the request, communicate with other servers (for example, a database server) as appropriate, and then return the result to the local client machine. All data transfers may be through network communication.

A heuristic rule may therefore indicate that the network traffic through a server associated with an application is proportional to the application throughput, which may be used as a performance metric for the application. As an example, if the network traffic associated with an application increases 2×, the application may throughput increases approximately 2×. Accordingly, the performance level of a processor executing a web-based application may be estimated in term of network traffic, which may be generic and application-independent.

The network traffic data may be collected while dynamically varying the operating frequency of the processor. With enough data samples, the correlation of processor application performance ("AP") versus processor operating frequency (f) may be established as, $$AP(f)=b_2 \times f^2 b_1 \times f+b_0, \text{ where } b_2 \leq 0 \qquad (2)$$

Thus, the collection of network traffic data may enable the coefficients $b_0$-$b_3$ to be determined while the application in question is executing (e.g., in real-time).

IPC (instruction per cycle) may also be used as an indicator of processor performance under some circumstances (e.g., little contention). Thus, IPC may be combined with other performance and/or contention-related counters to estimate application performance.

Block 20 may provide for determining whether a utilization threshold (e.g., 50%) of the processor has been reached. If the utilization threshold is reached, illustrated block 22 sets the operating frequency of the processor to a value based on the first real-time correlation and the second real-time correlation.

More particularly, the optimization challenge be formulated as the following mathematical problem, which identifies the frequency that maximizes PP(f) with a constraint $f_1 \leq f \leq f_2$, where $f_1$ and $f_2$ denote the lowest and highest processor frequency, respectively.

$$PP(f)=AP(f)/PC(f)=[b_2 \times f^2+b_1 \times f+b_0]/[a_3 \times f^3+a_2 \times f^2+a_1 \times f+a_0] \qquad (3)$$

To identify the frequency that maximizes performance per power may be achieved either analytically or numerically. The analytic solution may be to solve equation (4) below. The numerical solution may be to gradually vary f, calculate PP(f), and identify the f that corresponds to the highest PP(f).

$$[PP(f)]'=[AP(f)/PC(f)]'=\{PC(f)[AP(f)]'-AP(f)[PC(f)]'\}/[PC(f)]^2=0 \qquad (4)$$

Once the optimal frequency is identified, the processor operating frequency may be set to a value accordingly at block 22, wherein the performance level of the processor decreases at one or more operating frequencies greater than the set value, and the illustrated method 14 terminates. The above optimizations may have no dependency on application providers and may be conducted transparently without user intervention. Moreover, PC(f) and AP(f) may not necessarily be in the form of $2^{nd}$ or $3^{rd}$ order polynomial functions. If it is determined either at block 16 that real-time frequency optimizations are not enabled or at block 20 that the utilization threshold has not been reached, the method 14 may terminate.

Figure 4:
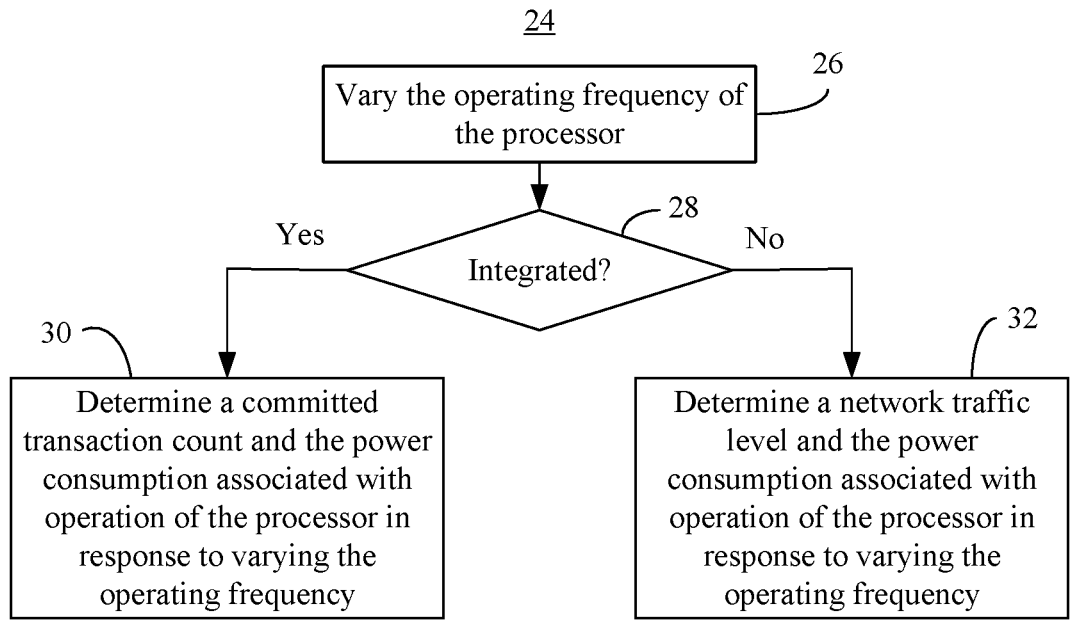
FIG. 4 is a flowchart of an example of a method of performing data collection according to an embodiment.

FIG. 4 shows a method 24 of performing data collection. The method 24 may generally be substituted for processing block 18 (FIG. 3), already discussed. More particularly, the method 24 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 26 provides for varying the operating frequency of a processor. Block 26 may include setting, in real-time, the operating frequency of the processor to different values (e.g., at an appropriate step size). If it is determined at block 28 that the optimization component is integrated with the application executing on the processor (e.g., system level privileges were obtained during installation of the application), block 30 may determine a committed transaction count and the power consumption associated with operation of the processor in response to varying the operating frequency of the processor. If the optimization component is not integrated with the application (e.g., OS kernel driver and/or frequency governor), illustrated block 32 determines a network traffic level and the power consumption associated with operation of the processor in response to varying the operating frequency of the processor. In either instance, the first real-time correlation between power consumption and operating frequency and the second real-time correlation between performance level and operating frequency may be determined concurrently. Indeed, simultaneously collecting the data as shown in blocks 30 and 32 may further normalize the correlations and eliminate/reduce the impact of other factors (e.g., temperature, age, etc.).

Figure 5:
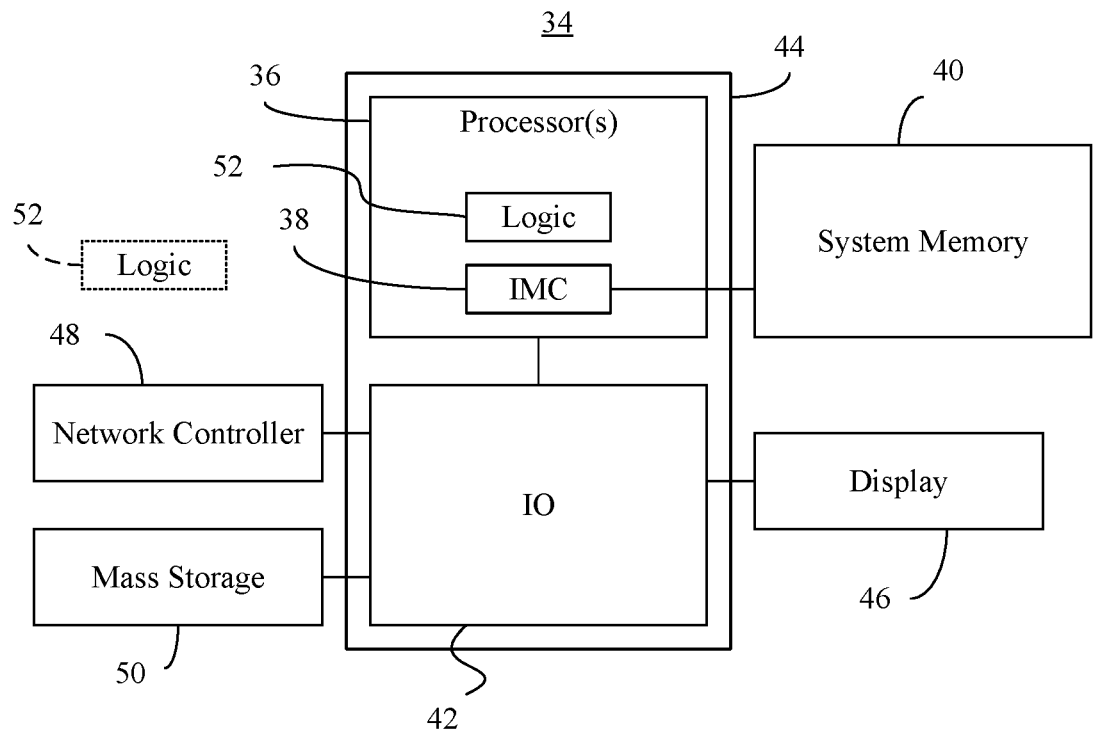
FIG. 5 is a block diagram of an example of a computing system according to an embodiment.

Turning now to FIG. 5, a frequency-optimized computing system 34 is shown. The computing system 34 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), etc., or any combination thereof. In the illustrated example, the system 34 includes one or more processors 36 (e.g., host processor(s), central processing unit(s)/CPU(s) with one or more processor cores) having an integrated memory controller (IMC) 38 that is coupled to a system memory 40.

The illustrated system 34 also includes an input output (IO) module 42 implemented together with the processor(s) 36 on a semiconductor die 44 as a system on chip (SoC), wherein the IO module 42 functions as a host device and may communicate with, for example, a display 46 (e.g., touch screen, liquid crystal display/LCD, light emitting diode/LED display), a network controller 48 (e.g., wired and/or wireless), and mass storage 50 (e.g., hard disk drive/HDD, optical disk, solid state drive/SSD, flash memory). The processor(s) 36 may include logic 52 (e.g., logic instructions, configurable logic, fixed-functionality hardware logic, etc., or any combination thereof) to perform one or more aspects of the method 14 (FIG. 3) and/or the method 24 (FIG. 4). Thus, the logic 52 may determine a first real-time correlation between a power consumption of the processor(s) 36 and an operating frequency of the processor(s), determine a second real-time correlation between a performance level of the processor(s) and the operating frequency of the processor(s), and set the operating frequency of the processor(s) to a value based on the first real-time correlation and the second real-time correlation. As already noted, the performance level or performance per power of the processor may decrease at one or more operating frequencies greater than the value.

Figure 6:
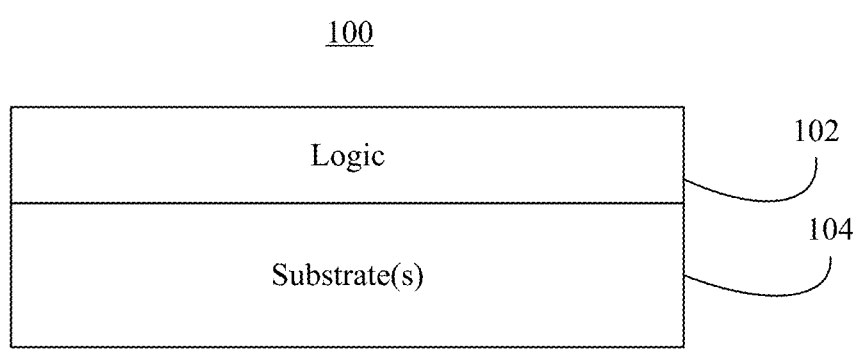
FIG. 6 is an illustration of an example of a semiconductor package apparatus according to an embodiment.

FIG. 6 shows a semiconductor package apparatus 100. The apparatus 100 may implement one or more aspects of the method 14 (FIG. 3) and/or the method 24 (FIG. 4) and may be readily substituted for the semiconductor die 44 (FIG. 5), already discussed. The illustrated apparatus 100 includes one or more substrates 104 (e.g., silicon, sapphire, gallium arsenide) and logic 102 (e.g., transistor array and other integrated circuit/IC components) coupled to the substrate(s) 104. The logic 102 may be implemented at least partly in configurable logic or fixed-functionality logic hardware. In one example, the logic 102 includes transistor channel regions that are positioned (e.g., embedded) within the substrate(s) 104. Thus, the interface between the logic 102 and the substrate(s) 104 may not be an abrupt junction. The logic 102 may also be considered to include an epitaxial layer that is grown on an initial wafer of the substrate(s) 104.

Figure 7:
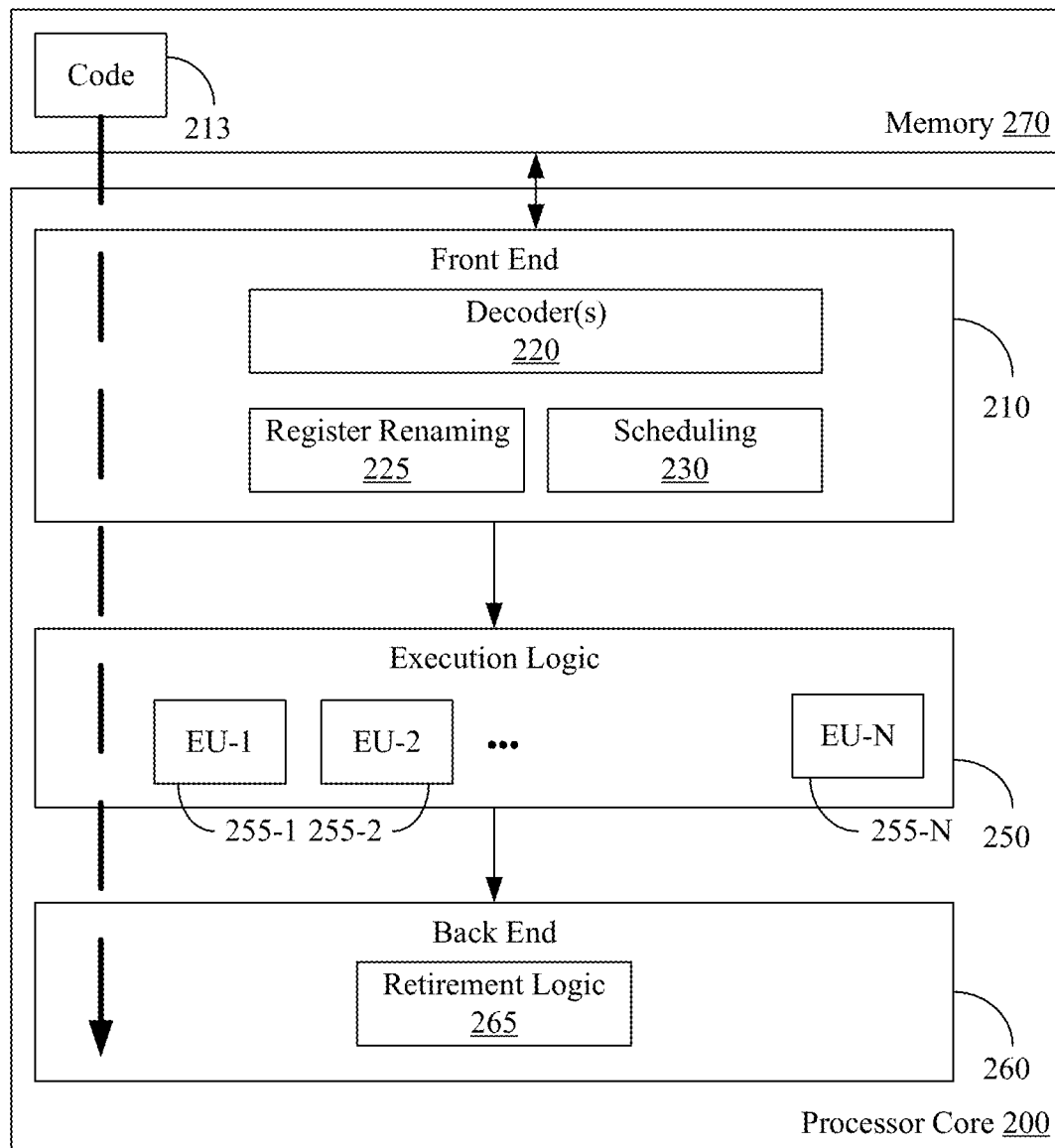
FIG. 7 is a block diagram of an example of a processor according to an embodiment.

FIG. 7 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 7, a processing element may alternatively include more than one of the processor core 200 illustrated in FIG. 7. The processor core 200 may be a single-threaded core or, for at least one embodiment, the processor core 200 may be multithreaded in that it may include more than one hardware thread context (or "logical processor") per core.

FIG. 7 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 14 (FIG. 3) and/or the method 24 (FIG. 4), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 7, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 8, shown is a block diagram of a computing system 1000 embodiment in accordance with an embodiment. Shown in FIG. 8 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 8 may be implemented as a multi-drop bus rather than point-to-point interconnect.

As shown in FIG. 8, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 7.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 8, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 8, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 8, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 14 (FIG. 3) and/or the method 24 (FIG. 4), already discussed, and may be similar to the code 213 (FIG. 7), already discussed. Further, an audio I/O 1024 may be coupled to second bus 1020 and a battery 1010 may supply power to the computing system 1000.

Note that other embodiments are contemplated. For example, instead of the point-to-point architecture of FIG. 8, a system may implement a multi-drop bus or another such communication topology. Also, the elements of FIG. 8 may alternatively be partitioned using more or fewer integrated chips than shown in FIG. 8.

ADDITIONAL NOTES AND EXAMPLES

Example 1 may include a computing system comprising a network controller, a processor coupled to the network controller, and a memory coupled to the processor, the memory including instructions, which when executed by the processor, cause the computing system to determine a first real-time correlation between a power consumption of the processor and an operating frequency of the processor, determine a second real-time correlation between a performance level of the processor and the operating frequency of the processor, and set the operating frequency of the processor to a value based on the first real-time correlation and the second real-time correlation, wherein the performance level of the processor is to decrease at one or more operating frequencies greater than the value.

Example 2 may include the computing system of Example 1, wherein the instructions, when executed, cause the computing system to vary the operating frequency of the processor, and determining one or more of a committed transaction count or a network traffic level associated with operation of the processor in response to varying the operating frequency of the processor to determine the second real-time correlation.

Example 3 may include the computing system of Example 1, wherein the instructions, when executed, cause the computing system to vary the operating frequency of the processor, and determine the power consumption in response to varying the operating frequency of the processor to determine the first real-time correlation.

Example 4 may include the computing system of Example 1, wherein the memory is to store a lookup table and the instructions, when executed, cause the computing system to retrieve the first real-time correlation from the lookup table.

Example 5 may include the computing system of Example 1, wherein the first real-time correlation and the second real-time correlation are to be determined concurrently.

Example 6 may include the computing system of any one of Examples 1 to 5, wherein the operating frequency of the processor is to be set to the value in response to a utilization threshold of the processor being reached.

Example 7 may include a semiconductor package apparatus comprising one or more substrates, and logic coupled to the one or more substrates, wherein the logic is implemented in one or more of configurable logic or fixed-functionality hardware logic, the logic coupled to the one or more substrates to determine a first real-time correlation between a power consumption of a processor and an operating frequency of the processor, determine a second real-time correlation between a performance level of the processor and the operating frequency of the processor, and set the operating frequency of the processor to a value based on the first real-time correlation and the second real-time correlation, wherein the performance level of the processor is to stop increasing at one or more operating frequencies greater than the value.

Example 8 may include the semiconductor package apparatus of Example 7, wherein the logic coupled to the one or more substrates is to vary the operating frequency of the processor, and determining one or more of a committed transaction count or a network traffic level associated with operation of the processor in response to varying the operating frequency of the processor to determine the second real-time correlation.

Example 9 may include the semiconductor package apparatus of Example 7, wherein the logic coupled to the one or more substrates is to vary the operating frequency of the processor, and determine the power consumption in response to varying the operating frequency of the processor to determine the first real-time correlation.

Example 10 may include the semiconductor package apparatus of Example 7, wherein the logic coupled to the one or more substrates is to retrieve the first real-time correlation from a lookup table.

Example 11 may include the semiconductor package apparatus of Example 7, wherein the first real-time correlation and the second real-time correlation are to be determined concurrently.

Example 12 may include the semiconductor package apparatus of any one of Examples 7 to 11, wherein the operating frequency of the processor is to be set to the value in response to a utilization threshold of the processor being reached.

Example 13 may include the semiconductor package apparatus of any one of Examples 7 to 11, wherein the logic coupled to the one or more substrates includes transistor channel regions that are positioned within the one or more substrates.

Example 14 may include a method comprising determining a first real-time correlation between a power consumption of a processor and an operating frequency of the processor, determining a second real-time correlation between a performance level of the processor and the operating frequency of the processor, and setting the operating frequency of the processor to a value based on the first real-time correlation and the second real-time correlation, wherein the performance level of the processor stops increasing at one or more operating frequencies greater than the value.

Example 15 may include the method of Example 14, wherein determining the second real-time correlation includes varying the operating frequency of the processor, and determining one or more of a committed transaction count or a network traffic level associated with operation of the processor in response to varying the operating frequency of the processor.

Example 16 may include the method of Example 14, wherein determining the first real-time correlation includes varying the operating frequency of the processor, and determining the power consumption in response to varying the operating frequency of the processor.

Example 17 may include the method of Example 14, wherein determining the first real-time correlation includes retrieving the first real-time correlation from a lookup table.

Example 18 may include the method of Example 14, wherein the first real-time correlation and the second real-time correlation are determined concurrently.

Example 19 may include the method of any one of Examples 14 to 18, wherein the operating frequency of the processor is set to the value in response to a utilization threshold of the processor being reached.

Example 20 may include at least one computer readable storage medium comprising a set of instructions, which when executed by a computing system, cause the computing system to determine a first real-time correlation between a power consumption of a processor and an operating frequency of the processor, determine a second real-time correlation between a performance level of the processor and the operating frequency of the processor, and set the operating frequency of the processor to a value based on the first real-time correlation and the second real-time correlation, wherein the performance level of the processor is to stop increasing at one or more operating frequencies greater than the value.

Example 21 may include the at least one computer readable storage medium of Example 20, wherein the instructions, when executed, cause the computing system to vary the operating frequency of the processor, and determining one or more of a committed transaction count or a network traffic level associated with operation of the processor in response to varying the operating frequency of the processor to determine the second real-time correlation.

Example 22 may include the at least one computer readable storage medium of Example 20, wherein the instructions, when executed, cause the computing system to vary the operating frequency of the processor, and determine the power consumption in response to varying the operating frequency of the processor to determine the first real-time correlation.

Example 23 may include the at least one computer readable storage medium of Example 20, wherein the instructions, when executed, cause the computing system to retrieve the first real-time correlation from a lookup table.

Example 24 may include the at least one computer readable storage medium of Example 20, wherein the first real-time correlation and the second real-time correlation are to be determined concurrently.

Example 25 may include the at least one computer readable storage medium of any one of Examples 20 to 24, wherein the operating frequency of the processor is to be set to the value in response to a utilization threshold of the processor being reached.

Example 26 may include a semiconductor package apparatus comprising means for determining a first real-time correlation between a power consumption of a processor and an operating frequency of the processor, means for determining a second real-time correlation between a performance level of the processor and the operating frequency of the processor, and means for setting the operating frequency of the processor to a value based on the first real-time correlation and the second real-time correlation, wherein the performance level of the processor stops increasing at one or more operating frequencies greater than the value.

Example 27 may include the apparatus of Example 26, wherein the means for determining the second real-time correlation includes means for varying the operating frequency of the processor, and means for determining one or more of a committed transaction count or a network traffic level associated with operation of the processor in response to varying the operating frequency of the processor.

Example 28 may include the apparatus of Example 26, wherein the means for determining the first real-time correlation includes means for varying the operating frequency of the processor, and means for determining the power consumption in response to varying the operating frequency of the processor.

Example 29 may include the apparatus of Example 26, wherein the means for determining the first real-time correlation includes means for retrieving the first real-time correlation from a lookup table.

Example 30 may include the apparatus of Example 26, wherein the first real-time correlation and the second real-time correlation are to be determined concurrently.

Example 31 may include the apparatus of any one of Examples 26 to 30, wherein the operating frequency of the processor is to be set to the value in response to a utilization threshold of the processor being reached.

Thus, technology described herein may provide an effective apparatus to optimize both system performance and power consumption simultaneously (e.g., to maximize application performance per watt/power consumption), even if no a priori knowledge of the application is available. In addition to reducing power consumption, the technology may improve the user experience. In one example, a processor having a relatively wide frequency range provides optimal performance-per-power for a wider selection of software applications with different performance characteristics.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
   a network controller;
   a processor coupled to the network controller; and
   a memory coupled to the processor, the memory including executable computer program instructions comprising an optimization component, which when executed by the processor, cause the computing system to:
   determine whether the optimization component is integrated with an executing application;
   determine a first real-time correlation between a power consumption of the processor and an operating frequency of the processor;
   determine a second real-time correlation between a performance level of the processor and the operating frequency of the processor, wherein the performance level of the processor is determined according to a first performance metric, if the optimization component is integrated with an executing application, or a second performance metric, if the optimization component is not integrated with the executing application; and
   set the operating frequency of the processor to a value based on the first real-time correlation and the second real-time correlation, wherein the performance level of the processor is to decrease at one or more operating frequencies greater than the value;
   wherein the first performance metric comprises at least one of a committed transaction count, transactions per second, jobs per second, page downloads per second, or instructions per cycle, and the second the performance metric comprises a network traffic level.

2. The computing system of claim 1, wherein to determine the second real-time correlation the instructions, when executed by the processor, cause the computing system to:
   vary the operating frequency of the processor; and
   determine the performance level of the processor in response to varying the operating frequency of the processor.

3. The computing system of claim 1, wherein to determine the first real-time correlation the instructions, when executed by the processor, cause the computing system to:
   vary the operating frequency of the processor; and
   determine the power consumption in response to varying the operating frequency of the processor.

4. The computing system of claim 1, wherein the memory is to store a lookup table and the instructions, when executed by the processor, cause the computing system to retrieve the first real-time correlation from the lookup table.

5. The computing system of claim 1, wherein the first real-time correlation and the second real-time correlation are to be determined concurrently.

6. The computing system of claim 1, wherein the operating frequency of the processor is to be set to the value in response to a utilization threshold of the processor being reached.

7. A semiconductor package apparatus comprising:
one or more substrates; and
logic comprising an optimization component coupled to the one or more substrates, wherein the logic is implemented in one or more of configurable logic or fixed-functionality hardware logic, the logic coupled to the one or more substrates to:
determine whether the optimization component is integrated with an executing application;
determine a first real-time correlation between a power consumption of a processor and an operating frequency of the processor,
determine a second real-time correlation between a performance level of the processor and the operating frequency of the processor, wherein the performance level of the processor is determined according to a first performance metric, if the optimization component is integrated with an executing application, or a second performance metric, if the optimization component is not integrated with the executing application, and
set the operating frequency of the processor to a value based on the first real-time correlation and the second real-time correlation, wherein the performance level of the processor is to decrease at one or more operating frequencies greater than the value;
wherein the first performance metric comprises at least one of a committed transaction count, transactions per second, jobs per second, page downloads per second, or instructions per cycle, and the second the performance metric comprises a network traffic level.

8. The semiconductor package apparatus of claim 7, wherein to determine the second real-time correlation the logic coupled to the one or more substrates is to:
vary the operating frequency of the processor, and
determine the performance level of the processor in response to varying the operating frequency of the processor.

9. The semiconductor package apparatus of claim 7, wherein to determine the first real-time correlation the logic coupled to the one or more substrates is to:
vary the operating frequency of the processor, and
determine the power consumption in response to varying the operating frequency of the processor.

10. The semiconductor package apparatus of claim 7, wherein the logic coupled to the one or more substrates is to retrieve the first real-time correlation from a lookup table.

11. The semiconductor package apparatus of claim 7, wherein the first real-time correlation and the second real-time correlation are to be determined concurrently.

12. The semiconductor package apparatus of claim 7, wherein the operating frequency of the processor is to be set to the value in response to a utilization threshold of the processor being reached.

13. The semiconductor package apparatus of claim 7, wherein the logic coupled to the one or more substrates includes transistor channel regions that are positioned within the one or more substrates.

14. A method of operating an optimization component comprising:
determining whether the optimization component is integrated with an executing application;
determining a first real-time correlation between a power consumption of a processor and an operating frequency of the processor;
determining a second real-time correlation between a performance level of the processor and the operating frequency of the processor, wherein the performance level of the processor is determined according to a first performance metric, if the optimization component is integrated with an executing application, or a second performance metric, if the optimization component is not integrated with the executing application; and
setting the operating frequency of the processor to a value based on the first real-time correlation and the second real-time correlation, wherein the performance level of the processor decreases at one or more operating frequencies greater than the value;
wherein the first performance metric comprises at least one of a committed transaction count, transactions per second, jobs per second, page downloads per second, or instructions per cycle, and the second the performance metric comprises a network traffic level.

15. The method of claim 14, wherein determining the second real-time correlation includes:
varying the operating frequency of the processor; and
determining the performance level of the processor in response to varying the operating frequency of the processor.

16. The method of claim 14, wherein determining the first real-time correlation includes:
varying the operating frequency of the processor; and
determining the power consumption in response to varying the operating frequency of the processor.

17. The method of claim 14, wherein determining the first real-time correlation includes retrieving the first real-time correlation from a lookup table.

18. The method of claim 14, wherein the first real-time correlation and the second real-time correlation are determined concurrently.

19. The method of claim 14, wherein the operating frequency of the processor is set to the value in response to a utilization threshold of the processor being reached.

20. At least one computer readable non-transitory storage medium comprising a set of instructions, the instructions comprising an optimization component which when executed by a computing system, cause the computing system to:
determine whether the optimization component is integrated with an executing application;
determine a first real-time correlation between a power consumption of a processor and an operating frequency of the processor;
determine a second real-time correlation between a performance level of the processor and the operating frequency of the processor, wherein the performance level of the processor is determined according to a first performance metric, if the optimization component is integrated with an executing application, or a second performance metric, if the optimization component is not integrated with the executing application; and set the operating frequency of the processor to a value based on the first real-time correlation and the second real-time correlation, wherein the performance level of the processor is to decrease at one or more operating frequencies greater than the value;

wherein the first performance metric comprises at least one of a committed transaction count, transactions per second, jobs per second, page downloads per second, or instructions per cycle, and the second the performance metric comprises a network traffic level.

21. The at least one computer readable non-transitory storage medium of claim 20, wherein to determine the second real-time correlation the instructions, when executed by the computing system, cause the computing system to:

vary the operating frequency of the processor; and
determine the performance level of the processor in response to varying the operating frequency of the processor.

22. The at least one computer readable non-transitory storage medium of claim 20, wherein to determine the first real-time correlation the instructions, when executed by the computing system, cause the computing system to:

vary the operating frequency of the processor; and
determine the power consumption in response to varying the operating frequency of the processor.

23. The at least one computer readable non-transitory storage medium of claim 20, wherein the instructions, when executed by the computing system, cause the computing system to retrieve the first real-time correlation from a lookup table.

24. The at least one computer readable non-transitory storage medium of claim 20, wherein the first real-time correlation and the second real-time correlation are to be determined concurrently.

25. The at least one computer readable non-transitory storage medium of claim 20, wherein the operating frequency of the processor is to be set to the value in response to a utilization threshold of the processor being reached.

* * * * *